United States Patent
Zanini

(10) Patent No.: US 10,238,034 B2
(45) Date of Patent: Mar. 26, 2019

(54) COUPLING DEVICE FOR POWER-OPERATED MACHINES

(71) Applicant: MULTIONE SRL, Grumolo Delle Abbadesse (IT)

(72) Inventor: Stefano Zanini, Grumolo Delle Abbadesse (IT)

(73) Assignee: MULTIONE SRL, Vicenza (IT)

( * ) Notice: Subject to any disclaimer, the term of this patent is extended or adjusted under 35 U.S.C. 154(b) by 0 days.

(21) Appl. No.: 15/608,486

(22) Filed: May 30, 2017

(65) Prior Publication Data

US 2017/0339831 A1 Nov. 30, 2017

(30) Foreign Application Priority Data

May 30, 2016 (IT) .................. 102016000055359
May 30, 2016 (IT) .................... UA2016A3912

(51) Int. Cl.
| | |
|---|---|
| *A01B 59/00* | (2006.01) |
| *A01D 67/00* | (2006.01) |
| *A01B 59/06* | (2006.01) |
| *A01D 34/66* | (2006.01) |

(52) U.S. Cl.
CPC .......... *A01D 67/005* (2013.01); *A01B 59/002* (2013.01); *A01B 59/06* (2013.01); *A01B 59/064* (2013.01); *A01D 34/662* (2013.01)

(58) Field of Classification Search
CPC ....... A01B 59/06; A01B 73/005; A01B 73/00; A01B 63/002; A01B 63/16; A01B 63/22; A01B 69/003; A01B 59/002; A01B 59/064; A01D 75/30; A01D 75/306; A01D 67/005; A01D 34/62; A01D 34/661; A01D 34/86; A01D 43/00; A01D 43/06; A01D 34/662; B60D 1/44; B60D 1/46; B60D 1/50; B60D 1/52
USPC ....... 56/6, 7, 15.8, 15.9, 14.9; 280/439, 483, 280/484
See application file for complete search history.

(56) References Cited

U.S. PATENT DOCUMENTS

| | | | | |
|---|---|---|---|---|
| 4,769,976 | A * | 9/1988 | Bassett | A01D 75/30 56/249 |
| 4,926,621 | A * | 5/1990 | Torras | A01D 75/30 280/494 |
| 6,098,388 | A * | 8/2000 | Davies | A01D 34/62 56/249 |

(Continued)

FOREIGN PATENT DOCUMENTS

| | | |
|---|---|---|
| DE | 20 2007 011631 U1 | 10/2007 |
| EP | 0566033 A1 | 10/1993 |

(Continued)

*Primary Examiner* — Robert E Pezzuto
(74) *Attorney, Agent, or Firm* — R. Neil Sudol; Henry D. Coleman

(57) ABSTRACT

A coupling device, particularly for power-operated machines for agricultural use or the like, includes an oscillating frame which is detachably connected to a hitch assembly of an engine and a movable connection for associating with the oscillating frame the working means of a power-operated machine. The oscillating frame and the movable connecting means are configured to maintain, during use, the working plane of the power-operated machine substantially parallel to the ground, independently of the plane of arrangement of the wheels or of the tracks of the engine.

12 Claims, 3 Drawing Sheets

(56) References Cited

U.S. PATENT DOCUMENTS

| | | | | |
|---|---|---|---|---|
| 6,698,170 B2* | 3/2004 | Tironi | ................... | A01D 75/30 |
| | | | | 56/15.8 |
| 6,746,037 B1* | 6/2004 | Kaplenski | ................ | B60D 1/50 |
| | | | | 280/439 |
| 7,478,519 B2* | 1/2009 | Phillips | ................ | A01D 34/661 |
| | | | | 56/15.9 |
| 8,152,410 B2* | 4/2012 | Roth | ................... | E01C 19/235 |
| | | | | 172/604 |
| 9,179,591 B2* | 11/2015 | Barnett | ................. | A01B 63/22 |

FOREIGN PATENT DOCUMENTS

| | | | |
|---|---|---|---|
| FR | 2776467 | A1 | 10/1999 |
| NL | 1029929 | C2 | 8/2006 |

* cited by examiner

COUPLING DEVICE FOR POWER-OPERATED MACHINES

BACKGROUND OF THE INVENTION

The present invention relates to a coupling device for power-operated machines for agricultural use or the like, and to a power-operated machine that includes the device.

As is known, there are many types of power-operated machines for agricultural use, or road works or for building yards, which are conceived to be applied to engines, which have both the task of moving them and the task of providing them with the necessary actuation power.

Generally, the power-operated machines are frontally connected to the arm of a mechanical shovel or to the front three-point hitch of a tractor and have to adapt to any unevenness of the ground, without being damaged and without compromising the result of the operations for which they are intended.

In this regard, some power-operated machines are provided with hitch and suspension devices that allow them in some way to adapt to undulations of the ground.

NL1029929 discloses a front trailed linkage for hitching a mower to a tractor, having a machine and support frames connected by pivoting support arms which allow a side shift of the mower around obstacles.

DE202007011631 discloses a coupling device for agricultural operating machines having an oscillating frame removably connected to a coupling unit of an engine and a mobile connecting means adapted to maintain the working plane of the operating machine parallel to the ground.

However, the prior art devices may work rather well with relatively long and gentle sloping paths but show their limitations when the sloping portions shorten to the point of affecting only the working plane of the power-operated machine or only the resting plane of the wheels or tracks of the engine.

Those problems become even more evident when the undulations of the ground tend to tilt the machines laterally.

The above problems arise mainly from the fact that power-operated machines equipped with the conventional coupling systems substantially tend to follow the alignment variations of the engines that carry them and are therefore forced to move substantially integrally with them.

In addition to this, it should also be noted that in the case of some specific power-operated machines, such as for example shredders, the conventional coupling systems may cause jamming of the front part of the machines, with consequent possible damage both to the ground and to the machines themselves.

OBJECTS OF THE INVENTION

The aim of the present invention is to provide a coupling device, particularly for power-operated machines for agricultural use or the like, that solves the problems of the prior art cited above.

Within the scope of this aim, a particular object of the invention is to provide a coupling device which, in case of undulations of the ground, does not force the power-operated machine to follow the alignment variations to which the engine-powered motive or moving machine (hereinafter "engine") is subjected.

Another object of the invention is to provide a coupling device that allows the power-operated machine to also adapt to undulated portions that are short to the point of affecting only the working surface of the power-operated machine or only the resting plane of the wheels or tracks of the engine.

Another object of the invention is to provide a coupling device that allows the power-operated machine to also adapt to the slope variations that tend to tilt it laterally.

A further object of the invention is to provide a coupling device that prevents dangerous jammings of the power-operated machine.

Another object of the invention is to provide a coupling device which, if the power-operated machine is suitable for mowing grass or shredding grass or cuttings, allows to keep the cutting height as constant as possible even in the presence of unevenness of the ground.

Another object of the invention is to provide a coupling device that may be adapted to various types of power-operated machines, such as for example plant maintenance machines, soil treatment machines or machines for treating and conditioning surfaces.

Another object of the invention is to provide a coupling device that may be coupled both at the front and at the rear to an engine.

Another object of the invention is to provide a power-operated machine that is provided with the coupling device.

SUMMARY OF THE INVENTION

This aim, as well as these and other objects which will become better apparent hereinafter, are achieved by a coupling device for power-operated machines, comprising an oscillating frame which is detachably connected to a hitch assembly of an engine and a movable connection means for associating working means of a power-operated machine to said oscillating frame; said oscillating frame and said movable connecting means being configured to maintain the working plane of said power-operated machine substantially parallel to the ground, independently of the plane of arrangement of the wheels or of the tracks of said engine, during use; said oscillating frame comprising a first portion for suspension of said working means of said power-operated machine and a second portion for coupling to said hitch assembly; said first portion being rotatably connected to said second portion about a first oscillation axis that is substantially parallel to the advancement direction of said power-operated machine.

The aim and objects mentioned above are also achieved by a power-operated machine to be functionally associated with an engine and comprising a coupling device according to the appended claims.

BRIEF DESCRIPTION OF THE DRAWINGS

Further characteristics and advantages will become better apparent from the description of a preferred but not exclusive embodiment of a coupling device and of a power-operated machine according to the invention, illustrated by way of non-limiting example in the accompanying drawings, wherein.

DETAILED DESCRIPTION

Figure 1:
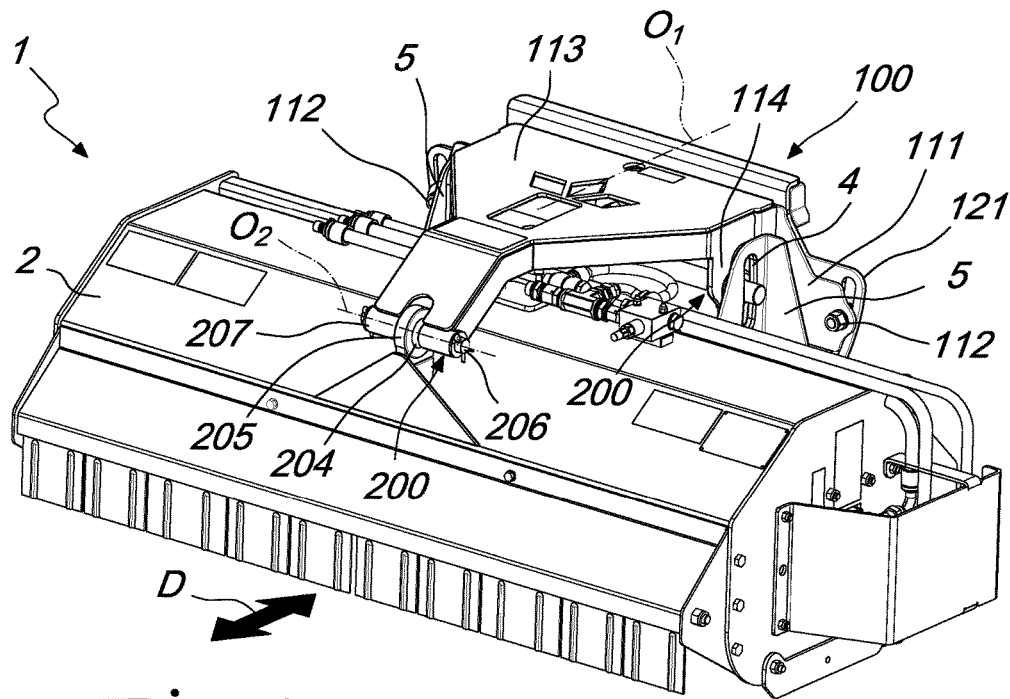
FIG. 1 is a front perspective view of a coupling device and of a power-operated machine according to the invention.
Figure 2:
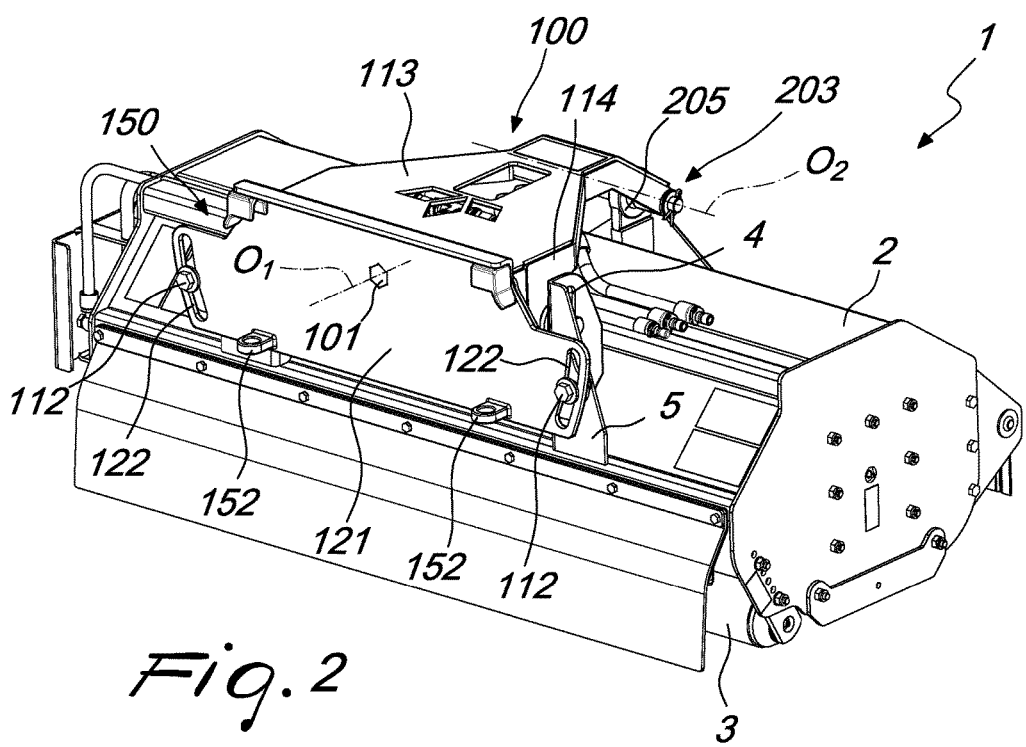
FIG. 2 is a rear perspective view of the coupling device and of the power-operated machine according to the invention.
Figure 3:
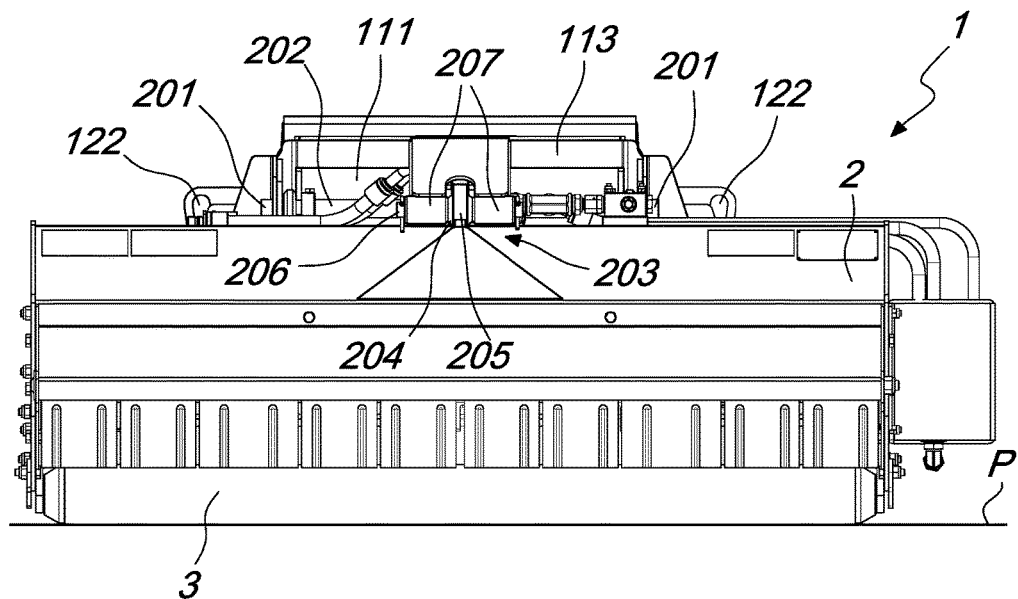
FIG. 3 is a front view of the coupling device and of the power-operated machine according to the invention.
Figure 4:
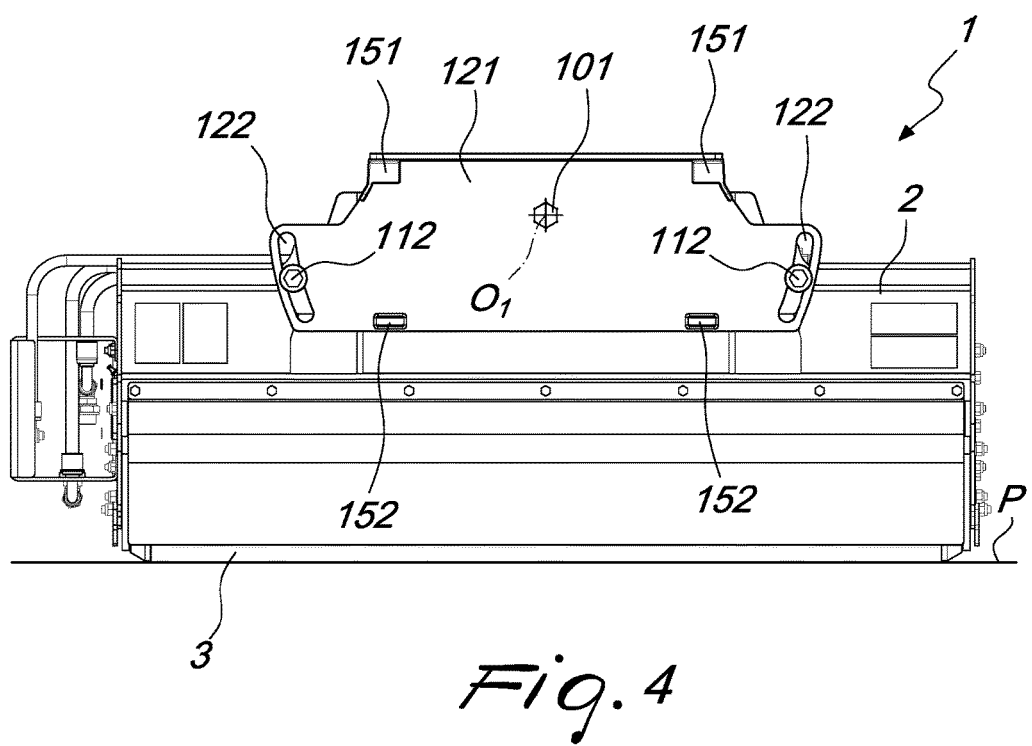
FIG. 4 is a rear view of the coupling device and of the power-operated machine according to the invention.
Figure 5:
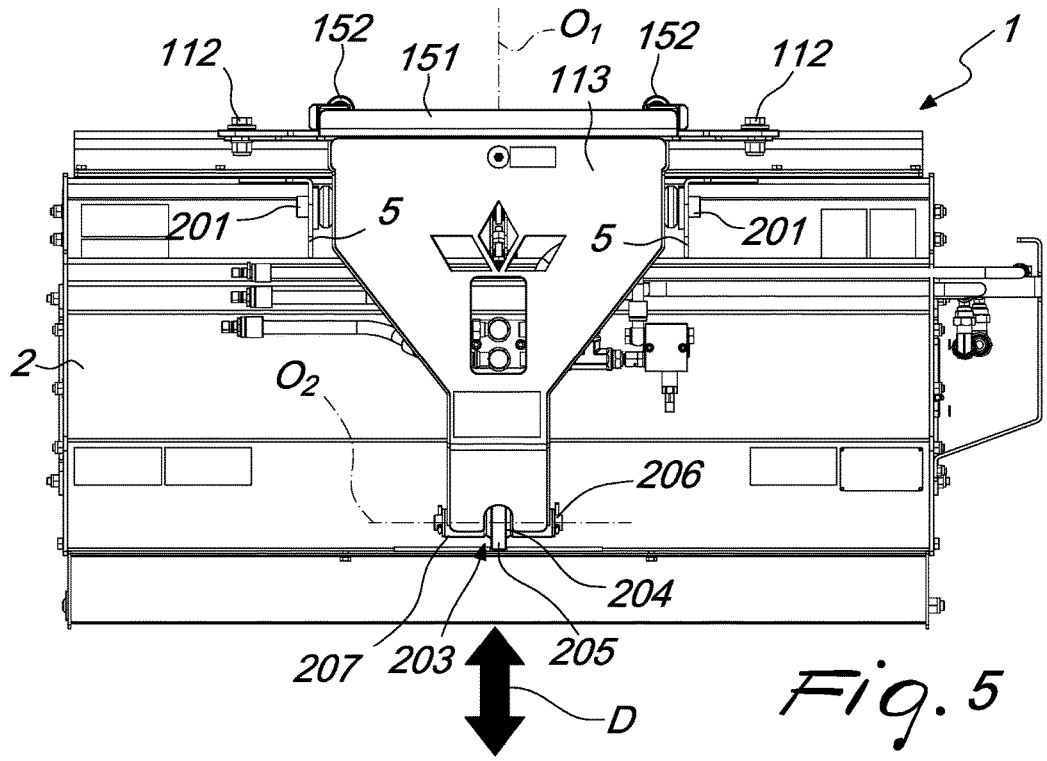
FIG. 5 is a top view of the coupling device and of the power-operated machine according to the invention.
Figure 6:
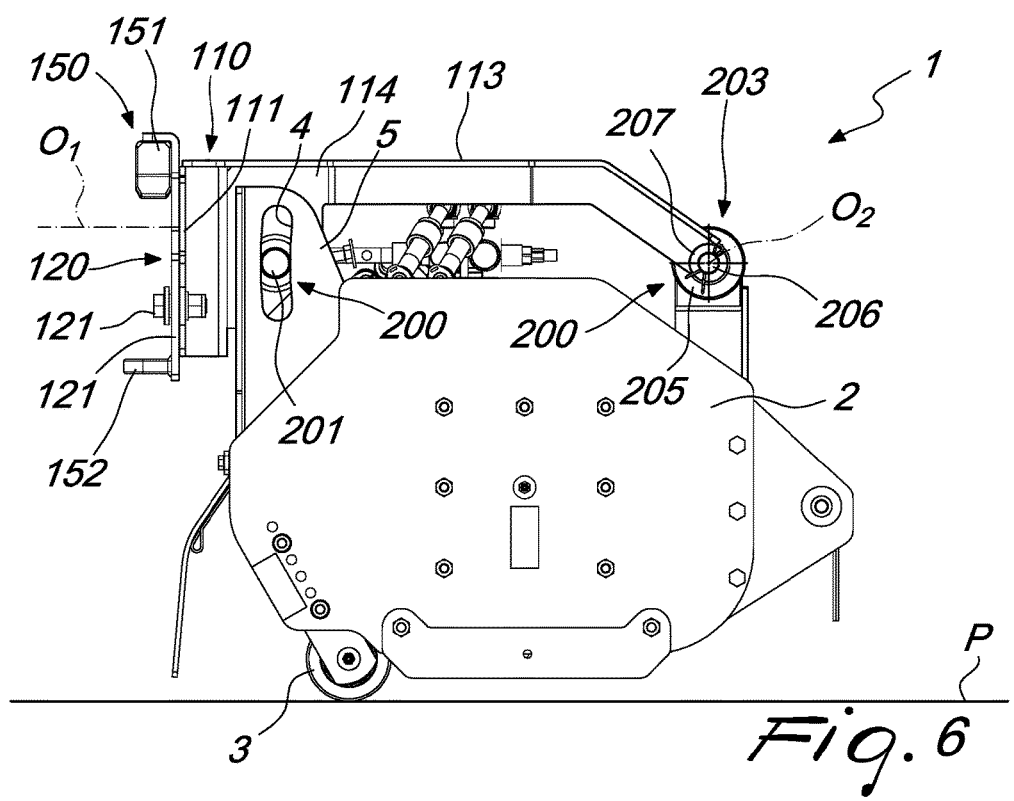
FIG. 6 is a side view of the coupling device and of the power-operated machine according to the invention.

With reference to the cited figures, the reference numeral 1 generally designates a power-operated machine, particularly for agricultural use or the like, designed to be moved and actuated by an adapted engine-powered motive or moving machine (hereinafter "engine").

In greater detail, the engine, that is per se known and is not shown in the figures, might be constituted by a mini-loader, by a tractor or by any other self-propelled vehicle suitable for the purpose.

In the illustrated example, the power-operated machine 1 is equipped with a means for plant maintenance, per se known, adapted for shredding grass, small cuttings and shrubs; however, it is evident to the person skilled in the art that the power-operated machine 1 might also include a different work means, without thereby abandoning the scope of the invention.

For example, the power-operated machine 1 might include means for soil treatment (hoe, harrow, tiller, stone burier, etc.), or a means for treating and conditioning surfaces (sweeper, leveling blade, snow thrower, etc.), or others.

Advantageously, said plant maintenance means is mounted on a chassis 2 which is provided with ground movement members 3.

The members 3 may be constituted by a roller which is arranged transversely to the advancement direction D of the power-operated machine 1 or by a pair of wheels or skids mounted on the sides of the chassis 2.

According to the present invention, the power-operated machine 1 is provided with a coupling device which includes an oscillating frame 100 which is detachably connected, by an interconnection means 150, to a front or rear hitch assembly of the engine, and a movable connection means 200 for associating the working means of the power-operated machine 1 to the oscillating frame 100.

Advantageously, the oscillating frame 100 and the movable connection means 200 are configured to keep the hypothetical working plane P of the power-operated machine 1 substantially parallel to the ground, independently of the plane of arrangement the wheels or of the tracks of the engine, during use.

The oscillating frame 100 includes a first portion 110 for suspension of the working means of the power-operated machine 1 and a second portion 120 for coupling to the hitch assembly.

Advantageously, the first portion 110 is connected to the second portion 120 so as to be able to oscillate about a first oscillation axis O1 which is substantially parallel to the advancement direction D of the power-operated machine 1.

For this purpose, the first portion 110 and the second portion 120 respectively include a first plate 111 and a second plate 121 which are substantially mutually parallel and are arranged transversely to the first oscillation axis O1.

The first plate 111 and the second plate 121 are coupled mechanically to each other by means of a fulcrum 101 which defines the first oscillation axis O1. Preferably, the fulcrum 101 is provided with a self-lubricating means which facilitates the relative movement of the plates.

In the embodiment shown in the figures, the oscillation of the first plate 111 with respect to the second plate 121 is limited by a pair of first pins 112, which are substantially parallel to the first oscillation axis O1 and protrude from the first plate 111 in such a manner as to engage respective curved slots 122 provided in the second plate 121 and arranged symmetrically to the first oscillation axis O1.

Preferably, the first pins 112 also are provided with a self-lubricating means which facilitates their sliding in the curved slots 122.

The first pins 112 may be constituted by a pair of bolts which are inserted in the curved slots 122 and are tightened to the point of maintaining the coupling between the first plate 111 and the second plate 121 and simultaneously maintaining the possibility of sliding.

The interconnection means 150 is provided on the second plate 121 and includes an edge 151, which has a substantially U-shaped cross-section, formed on the upper part of the second plate 121, and a pair of eyes 152 that protrude from the lower part of the plate.

Preferably, the edge 151 and the eyes 152 are configured to engage the hitch assembly of the engine.

A contoured arm 113, provided with the movable connection means 200, protrudes from the first plate 111.

In the present embodiment of the invention, the movable connection means 200 includes two second pins 201 which are substantially parallel to a second oscillation axis O2 which extends transversely to the first oscillation axis O1.

The two second pins 201 protrude laterally from the sides 114 of the contoured arm 113 so as to slidingly engage respective elongated slots 4 which extend transversely to the working plane P.

The elongated slots 4 are provided in a pair of posts 5 which rise from the upper part of the chassis 2.

Advantageously, the two second pins 201 correspond to the two opposite ends of a bar 202 which is fixed to the contoured arm 113 and is arranged transversely to the first oscillation axis O1.

The movable connection means 200 also includes a ball-and-socket joint 203, which is arranged substantially at the free end of the contoured arm 113.

The ball-and-socket joint 23, which forms the second oscillation axis O2, is constituted by a spherical dome 204 which is coupled to a complementarily shaped spherical surface of a bushing 205 which is fixed to the chassis 2.

Preferably, the spherical dome 204 is joined to the contoured arm 113 by means of a pin 206 which is engaged detachably with corresponding seats 207 formed at the free end of the arm.

According to a further aspect of the invention, the coupling device is provided with a return means, not shown in the figures, which is configured to autonomously return the working means of the power-operated machine 1 to a predefined neutral position when the stress that has modified its alignment ceases.

Preferably, the return means is of the elastic type and in particular can be constituted by one or more springs arranged in different points of the oscillating frame 100 and/or of the movable connection means 200.

In use, the oscillating frame 100 of the power-operated machine 1 is connected, by the interconnection means 150, to the hitch assembly of an engine, which also renders the working means operational.

The power-operated machine 1 may be coupled both to the front part and to the rear part of the engine, providing it with the necessary actuation power and also imparting a direction and orientation of travel D.

In this regard, the shape of the contoured arm 113 and the presence of the ball-and-socket joint 203 on its front end cause the working means of the power-operated machine 1 to be in practice towed by the engine, also in case of a front installation, even though in practice the engine applies a pushing action.

This configuration is particularly advantageous because it prevents any jamming of the working means of the power-operated machine 1, which would instead tend to occur with the prior art couplings.

The described shape of the oscillating frame 100 and the presence of the movable connecting means 200 allow the power-operated machine 1 to oscillate both with respect to the first oscillation axis O1, with a rolling motion, and with respect to the second oscillation axis O2, with a pitching motion.

In practice, oscillation with respect to the first oscillation axis O1 is determined by the fulcrum 101 and by the sliding of the first pins 112 in the curved slots 122, while the oscillation with respect to the second oscillation axis O2 is determined by the ball-and-socket joint 203 and by the sliding of the second pins 201 in the elongated slots 4.

These oscillations allow to maintain, during use, the working plane P of the power-operated machine 1 substantially parallel to the ground, independently of the plane of arrangement of the wheels or of the tracks of the engine.

The power-operated machine 1, by virtue of the coupling device according to the invention, in case of undulations of the ground is not forced to follow faithfully the alignment variations to which the engine is subjected.

This allows the power-operated machine 1 to adapt to undulated portions which are so short as to affect only its working plane P or only the resting plane of the wheels or of the tracks of the engine, and also to adapt to the slope variations that tend to tilt it laterally.

Also, if the power-operated machine 1 is preset to mow or shred grass or cuttings, the coupling device according to the invention allows to keep the cutting height as constant as possible even in the presence of irregularities of the ground and to prevent dangerous jammings of the machine.

When the stress that has modified its alignment ceases, the power-operated machine 1 is autonomously returned to a predefined neutral position by virtue of the return means, i.e., by virtue of springs that are appropriately sized and preloaded.

It has been found in practice that the coupling device, particularly for power-operated machines for agricultural use or the like, and the power-operated machine including the device, according to the invention, fully achieve the intended aim and objects.

The hitch device, particularly for power-operated machines for agricultural use or the like, and the power-operated machine including the device, thus conceived, are susceptible of numerous modifications and variations, all of which are within the scope of the inventive concept; all the details may furthermore be replaced with other technically equivalent elements.

In practice, the materials used, so long as they are compatible with the specific use, as well as the contingent shapes and dimensions, may vary according to the requirements and the state of the art.

The invention claimed is:

1. A coupling device for power-operated machines, comprising an oscillating frame which is detachably connectable to a hitch assembly of an engine of a motive machine and a movable connection means for associating working means of a power-operated machine to said oscillating frame; said oscillating frame and said movable connection means being configured to maintain a working plane of said power-operated machine substantially parallel to the ground, independently of the plane of arrangement of wheels or of tracks of said motive machine, during use; said oscillating frame comprising a first portion for suspension of said working means of said power-operated machine and a second portion for coupling to said hitch assembly; said first portion being rotatably connected to said second portion about a first oscillation axis that is substantially parallel to the advancement direction of said power-operated machine; said first portion comprising a contoured arm which protrudes from a first plate which is arranged transversely to said first oscillation axis; said second portion comprising a second plate, which is substantially parallel to said first plate and is provided with a means for interconnection to said hitch assembly; said first plate being connected rotatably to said second plate by means of a fulcrum which defines said first oscillation axis; said movable connection means comprising at least one ball-and-socket joint which is arranged at a free end of said contoured arm; said ball-and-socket joint defining a second oscillation axis which is transverse to said first oscillation axis.

2. The device according to claim 1, wherein said ball-and-socket joint comprises a spherical dome which is coupled to a complementarily shaped spherical surface of a bushing which is joined to said working means of said power-operated machine; said spherical dome being associated with said contoured arm by means of a pin which can engage detachably corresponding seats formed at the free end of said contoured arm.

3. The device according to claim 1, wherein said oscillating frame can be connected to said engine both at a front and at a rear side.

4. The device according to claim 1, comprising a return means adapted to autonomously return said power-operated machine to a predefined neutral position.

5. A power-operated machine to be functionally associated with said engine of said motive machine and comprising the coupling device according to claim 1.

6. The power-operated machine according to claim 5, wherein said working means includes plant maintenance means.

7. The power-operated machine according to claim 5, wherein said working means includes means for soil treatment.

8. The power-operated machine according to claim 5, wherein said working means includes means for treatment and conditioning of surfaces.

9. A coupling device for power-operated machines, comprising an oscillating frame which is detachably connectable to a hitch assembly of an engine of a motive machine and a movable connection means for associating working means of a power-operated machine to said oscillating frame; said oscillating frame and said movable connection means being configured to maintain a working plane of said power-operated machine substantially parallel to the ground, independently of the plane of arrangement of wheels or of tracks of said motive machine, during use; said oscillating frame comprising a first portion for suspension of said working means of said power-operated machine and a second portion for coupling to said hitch assembly; said first portion being rotatably connected to said second portion about a first oscillation axis that is substantially parallel to the advancement direction of said power-operated machine; said first portion comprising a contoured arm which protrudes from a first plate which is arranged transversely to said first oscillation axis; said second portion comprising a second plate, which is substantially parallel to said first plate and is provided with a means for interconnection to said hitch assembly; said first plate being connected rotatably to said second plate by means of a fulcrum which defines said first oscillation axis; wherein said second plate comprises a pair of curved slots which are substantially symmetrical to said first oscillation axis; said first plate comprises at least two first pins which are substantially parallel to said first oscillation axis: said first pins protruding from said first plate in order to engage slidingly therein with said curved slots.

10. The device according to claim 9, wherein said fulcrum and said first pins comprise a self-lubricating means for facilitating the movement of said first plate with respect to said second plate.

11. The device according to claim 10, wherein said movable connection means comprises at least two second pins which are substantially parallel to a second oscillation axis which is transverse to said first oscillation axis; said second pins protruding laterally from a side of said contoured arm in order to engage slidingly respective elongated slots provided in said working means of said power-operated machine and extended transversely to said working plane.

12. The device according to claim 11, wherein said second pins are constituted by opposite ends of a bar which is joined to said contoured arm and is arranged transversely to said first oscillation axis.

* * * * *